(12) United States Patent
Kim (10) Patent No.: US 11,698,167 B2
(45) Date of Patent: Jul. 11, 2023

(54) DISPLAY FIXING APPARATUS

(71) Applicant: LG Display Co., Ltd., Seoul (KR)

(72) Inventor: DuckSu Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 372 days.

(21) Appl. No.: 17/020,087

(22) Filed: Sep. 14, 2020

(65) Prior Publication Data

US 2021/0080053 A1 Mar. 18, 2021

(30) Foreign Application Priority Data

Sep. 16, 2019 (KR) .................. 10-2019-0113350

(51) Int. Cl.
*F16M 13/02* (2006.01)
*G06F 1/16* (2006.01)
*F16M 11/04* (2006.01)

(52) U.S. Cl.
CPC ........ *F16M 13/022* (2013.01); *F16M 11/041* (2013.01); *G06F 1/1607* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,581,422 A | * | 12/1996 | Umehara | ........... H02K 41/0358 360/264.7 |
| 7,459,813 B2 | * | 12/2008 | Naganuma | ........... H02K 1/2733 310/75 B |
| 9,709,215 B2 | | 7/2017 | Yoo et al. | |
| 2007/0159030 A1 | | 7/2007 | Naganuma et al. | |
| 2008/0303900 A1 | | 12/2008 | Stowe et al. | |
| 2016/0041420 A1 | * | 2/2016 | Takase | .............. G02F 1/133308 361/724 |
| 2016/0265715 A1 | | 9/2016 | Zing | |
| 2016/0348832 A1 | | 12/2016 | Yoo et al. | |
| 2018/0035559 A1 | * | 2/2018 | Kim | ....................... G09F 19/22 |

FOREIGN PATENT DOCUMENTS

| | | |
|---|---|---|
| CN | 101000446 A | 7/2007 |
| CN | 101064779 A | 10/2007 |
| CN | 205048112 U | 2/2016 |
| CN | 105430246 A | 3/2016 |
| CN | 205065225 U | 3/2016 |
| CN | 107471150 A | 12/2017 |
| CN | 109296912 A | 2/2019 |
| CN | 208476263 U | 2/2019 |
| KR | 10-2014-0104836 A | 8/2014 |
| KR | 10-2016-0141478 A | 12/2016 |
| KR | 10-1895522 B1 | 10/2018 |

OTHER PUBLICATIONS

Translation of CN-205048112-U (Year: 2016).*
Second Office Action and Search Report, China National Intellectual Property Administration Patent Application No. 202010966436.1, May 27, 2022, 13 pages.
China National Intellectual Property Administration, Office Action, CN Patent Application No. 202010966436.1, dated Feb. 15, 2022, 15 pages.

* cited by examiner

*Primary Examiner* — Monica E Millner
(74) *Attorney, Agent, or Firm* — Fenwick & West LLP (57) ABSTRACT

A display fixing apparatus, which enables a worker to fix a display to a wall at a position in front of the display, is provided.

15 Claims, 11 Drawing Sheets

DISPLAY FIXING APPARATUS

CROSS-REFERENCE TO RELATED APPLICATIONS

This application claims the benefit of the Republic of Korea Patent Application No. 10-2019-0113350 filed on Sep. 16, 2019, which is hereby incorporated by reference in its entirety.

BACKGROUND

Field of the Disclosure

The present disclosure relates to an apparatus for fixing a display to a wall.

Discussion of the Related Art

The thickness and weight of displays such as liquid crystal display (LCD) apparatuses and organic light emitting display apparatuses may be set to be very small. Therefore, a method of fixing a display to a wall is being widely used. Accordingly, various fixing apparatuses for fixing a display to a wall are being used.

In order to fix a display to a wall by using a fixing apparatus of the related art, a worker should be placed between the wall and the display. Therefore, at least an interval of 1 m should be maintained between the wall and the display, and as the interval increases, a space with the display placed therein is progressively narrowed. Also, in a case where a plurality of displays are fixed to a wall, an alignment state of the displays should be checked in a forward direction with respect to the displays, for allowing planes formed by the displays to accurately match therebetween.

In this case, the worker should check the alignment state of the displays while moving in a space between the displays and the wall in a forward direction with respect to the displays, or should be placed in the space between the displays and the wall in the forward direction with respect to the displays.

Therefore, a number of workers and much working time are needed in doing work using a display fixing apparatus of the related art.

Moreover, because the display fixing apparatus of the related art uses a method of simultaneously fastening adjacent displays, when the repair or replacement of one of displays is needed, the displays should be disassembled by lengthwise units or widthwise units. Due to this, a working time may increase, and a working process may be complicated.

SUMMARY

Accordingly, the present disclosure is directed to providing a display fixing apparatus that substantially obviates one or more problems due to limitations and disadvantages of the related art.

An aspect of the present disclosure is directed to providing a display fixing apparatus which enables a worker to fix a display to a wall at a position in front of the display.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display fixing apparatus including a fastening part having an adjustable length and a magnet wheel including a rotating magnet. The fastening part may include a display attachment part attached on a rear surface of the display, a wall attachment part attached on a wall, and a connection part connecting the display attachment part to the wall attachment part, a connection magnet being embedded into the connection part. The connection magnet may be rotated by the rotating magnet to adjust a length of fastening part.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 1:
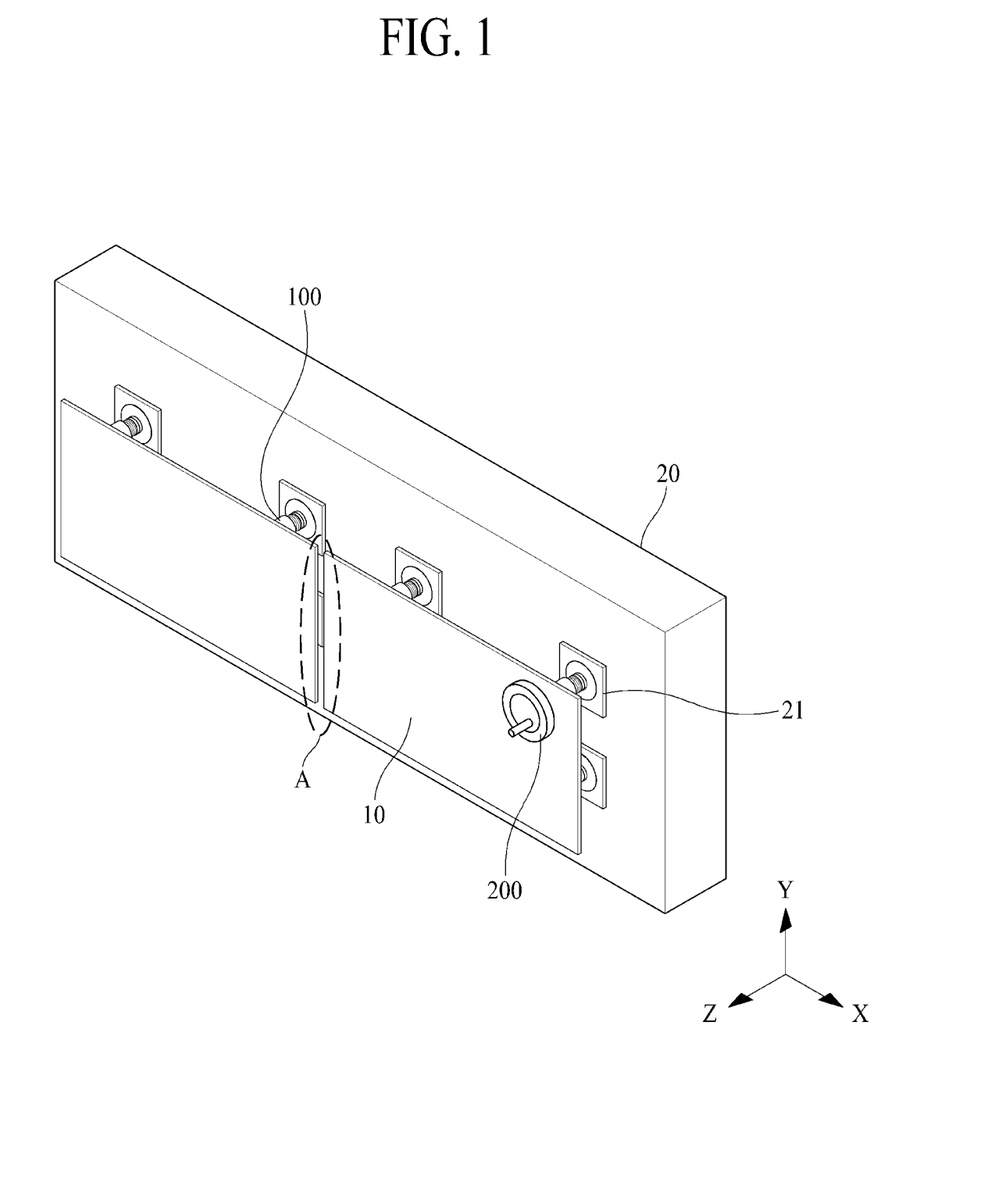
FIG. 1 is an exemplary diagram illustrating displays attached on a wall by a display fixing apparatus according to one embodiment of the present disclosure.
Figure 2:
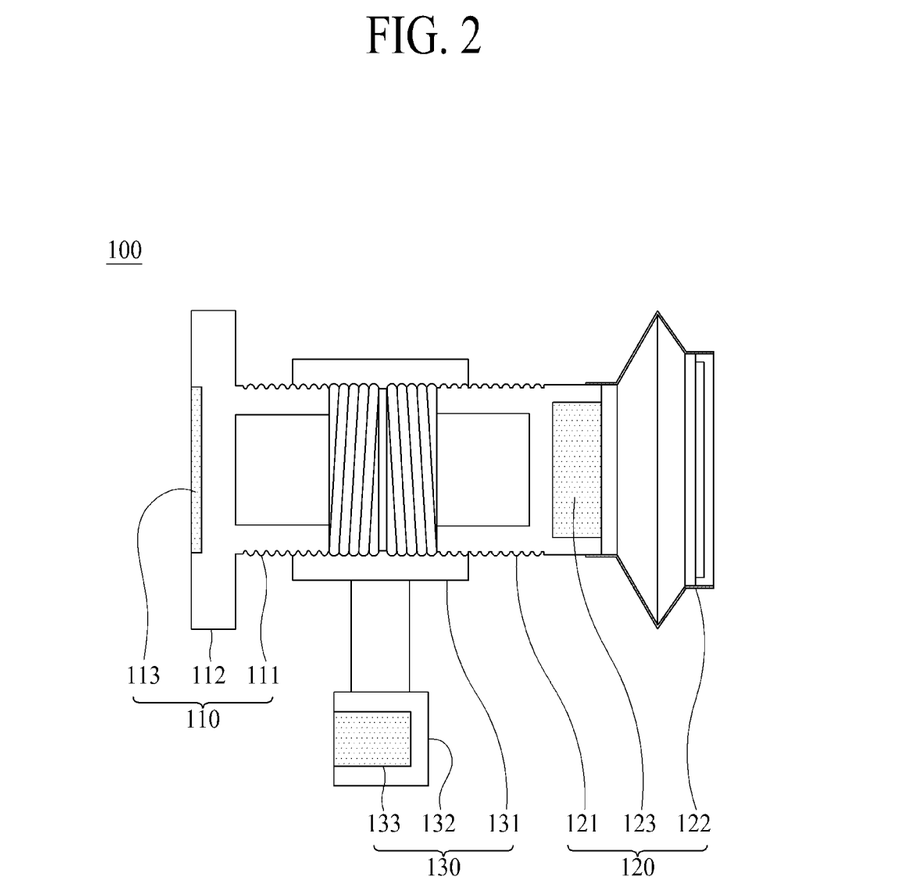
FIG. 2 is a cross-sectional view of a fastening part of a display fixing apparatus according to one embodiment of the present disclosure.
Figure 3:
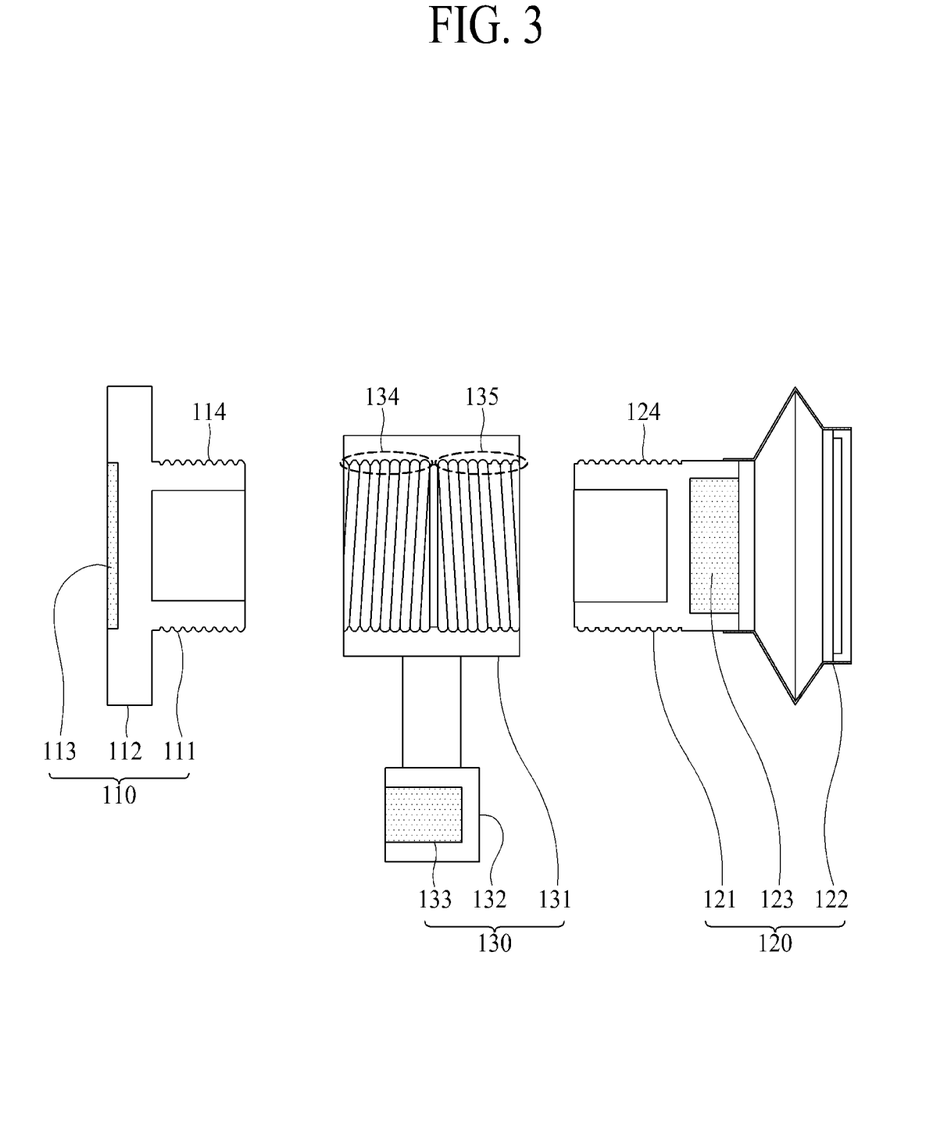
FIG. 3 is an exploded view of a fastening part of a display fixing apparatus according to one embodiment of the present disclosure.

FIG. 1 is an exemplary diagram illustrating displays attached on a wall by a display fixing apparatus according to the present disclosure, FIG. 2 is a cross-sectional view of a fastening part of the display fixing apparatus according to the present disclosure, and FIG. 3 is an exploded view of the fastening part of the display fixing apparatus according to the present disclosure.

The display fixing apparatus according to the present disclosure, as illustrated in FIGS. 1 to 3, may include a fastening part 100 having an adjustable length and a magnet wheel 200 including a rotating magnet.

The fastening part 100 may be disposed between a rear surface of a display 10 and a wall 20 and may fix the display 10 to the wall 20.

The magnet wheel 200 may be disposed on a front surface of the display 10. When a handle included in the magnet wheel 200 rotates, a rotating magnet included in the handle may also rotate, and thus, the length of the fastening part 100 may be adjusted.

To this end, as illustrated in FIGS. 2 and 3, the fastening part 100 may include a display attachment part 110 attached on the rear surface of the display 10, a wall attachment part 120 attached on the wall 20, and a connection part 130 which includes a connection magnet 133 embedded therein and connects the display attachment part 110 to the wall attachment part 120.

The rotating magnet may rotate the connection magnet 133, and thus, the length of the fastening part 100 may be adjusted.

Detailed elements of the display attachment part 110, the wall attachment part 120, and the connection part 130 each configuring the fastening part 100 will be described below.

First, the display attachment part 110 may include a first adhesive part 112 adhered to the rear surface of the display 10, a first extension part 111 provided in a cylindrical shape and connected to the connection part 130, and a first magnet 113 included in the first adhesive part 112.

The first adhesive part 112 may be provided at one end (for example, a second side) of the first extension part 111, and the other end (for example, a first side) of the first extension part 111 may be fastened to the connection part 130.

The first adhesive part 112 and the first extension part 111 may be provided as one body, or may be connected to each other through welding or the like.

A shape of the first adhesive part 112 may be one of various shapes such as a circular shape and a tetragonal shape.

An outer surface (i.e., a surface attached on the display 10) of the first adhesive part 112 may be provided to be flat.

The first magnet 113 may be equipped in the first adhesive part 112, or may be mounted on a flat surface of the first adhesive part 112. That is, the first magnet 113 may be exposed at the outside of the first adhesive part 112, or may not be exposed.

A magnetic force of the first magnet 113 may increase so that the first magnet 113 is well attached on the display 10. To this end, a size of the first magnet 113 may increase for enhancing efficiency. Therefore, an area, occupied by the first magnet 113, of the first adhesive part 112 may be formed to be greater than an area of a cross-sectional surface of the first extension part 111 taken along a direction vertical to a lengthwise direction of the first extension part 111.

The first magnet 113 may be attached on a display iron plate included in the display 10. The display iron plate may be fixed to an outer surface of the display 10 and may be exposed at the outside, or may be fixed to an inner surface of the display 10 and may not be exposed at the outside.

A plurality of first screw threads 114 may be formed on an outer circumference surface of the first extension part 111. In this case, the first extension part 111 may be inserted into an inner circumference surface of a rotation part 131 configuring the connection part 130, and the first screw threads 114 may be fastened to a plurality of third screw threads 134 formed on the inner circumference surface of the rotation part 131.

Second, the wall attachment part 120 may include a second adhesive part 122 adhered to the wall, a second extension part 121 provided in a cylindrical shape and connected to the connection part 130, and a second magnet 123 provided at a second side adjacent to the second adhesive part 122 among first and second sides of the second extension part 121.

The second adhesive part 122 may be provided at one end (for example, the second side) of the second extension part 121, and the other end (for example, the first side) of the second extension part 121 may be fastened to the connection part 130.

The second adhesive part 122 may be provided in an adsorption plate shape which is folded or unfolded in a lengthwise direction of the second extension part 121.

For example, as illustrated in FIGS. 2 and 3, the second adhesive part 122 may be implemented in a creased shape. In a state where the creases of the second adhesive part 122 are unfolded as illustrated in FIGS. 2 and 3, a worker may closely attach the second adhesive part 122 on the wall iron plate 21 mounted on the wall 20, and then, may move the second adhesive part 122 to detect an appropriate position to which the display 10 is to be fixed. After the appropriate position is determined, when the worker pushes the fastening part 100 toward the wall 20, the creases of the second adhesive part 122 may be unfolded. Therefore, the second magnet 123 provided at the second side of the second extension part 121 may be adjacent to the wall iron plate 21, the second magnet 123 may be attached on the wall iron plate 21 by a magnetic force.

In this case, the second adhesive part 122 may include various kinds of synthetic resins such as plastic, or may include silicon.

As another example, the second adhesive part 122 may be provided in an adsorption plate shape which is attached on a wall or the like by using a vacuum and is used as a hanger or the like. In this case, the second adhesive part 122 may include silicon. Therefore, even when there is no crease of the second adhesive part 122, a certain interval between the second extension part 121 and the wall iron plate 21 may be formed in a state where the second adhesive part 122 is unfolded. Also, when the worker pushes the second adhesive part 122 toward the wall iron plate 21, the second adhesive part 122 may be adhered to the wall iron plate 21, and thus, the second magnet 123 may be adjacent to the wall iron plate 21. Accordingly, the second magnet 123 may be attached on the wall iron plate 21 by a magnetic force.

In a case where the second adhesive part 122 is provided in a flat plate shape including a flat surface like the first adhesive part 121 and the second magnet 123 is included in the second adhesive part 122, the second magnet 123 may be attached on the wall iron plate 21 despite the second adhesive part 122 being slightly adjacent to the wall iron plate 21, in a process of attaching, by the worker, the display 10 on the wall 20. Accordingly, an operation of changing a position of the display 10 may be difficult to perform.

However, as described above, in a case where the second adhesive part 122 is provided in an adsorption plate shape folded or unfolded in a lengthwise direction of the second extension part 121 and the second magnet 123 is included in the second extension part 121, the second magnet 123 may be separated from the wall iron plate 21 by a certain interval in a process of attaching, by the worker, the display 10 on the wall 20. Accordingly, in a state where the second magnet 123 is not attached on the wall iron plate 21, the worker may freely change a position of the display 10.

The second magnet 123 may be provided at the second side adjacent to the second adhesive part 122 among the first and second sides of the second extension part 121.

The second magnet 123 may be equipped in the second extension part 121, or may be mounted on an outer surface of the second extension part 121. That is, the second magnet 123 may be exposed at the outside of the second extension part 121, or may not be exposed.

When the second magnet 123 is exposed at the outside of the second extension part 121, the second magnet 123 may be covered by the second adhesive part 122, or may be exposed at the outside through a hole formed in the second adhesive part 122.

A magnetic force of the second magnet 123 may increase so that the second magnet 123 is well attached on the wall iron plate 21, and to this end, a size of the second magnet 123 may increase for enhancing efficiency.

Because the second magnet 123 is included in the second extension part 121, an area of the second magnet 123 may be formed to be equal to or less than an area of a cross-sectional surface of the second extension part 121 taken along a direction vertical to a lengthwise direction of the second extension part 121.

Therefore, in order to increase the magnetic force of the second magnet 123, a thickness of the second magnet 123 may be set to be thicker than that of the first magnet 113.

The second magnet 123 may be attached on the wall iron plate 21 provided at the wall 20. The wall iron plate 21 may be fixed on outer surface of the wall 20 by an adhesive or a fastening device (for example, a bolt and/or the like)

A plurality of second screw threads 124 may be formed on an outer circumference surface of the second extension part 121. In this case, the second extension part 121 may be inserted into the inner circumference surface of the rotation part 131 configuring the connection part 130, and the second screw threads 124 may be fastened to a plurality of fourth screw threads 135 formed on the inner circumference surface of the rotation part 131.

Third, the connection part 130 may be provided in a cylindrical shape and may include the rotation part 131 which is connected to the first extension part 111 at a first side thereof and is connected to the second extension part 121 at a second side thereof, a protrusion portion 132 which protrudes to an outer circumference surface of the rotation part 131, and the connection magnet 133 which is provided in the protrusion portion 132.

The rotation part 131 may be provided in a cylindrical shape.

The protrusion portion 132 may protrude to the outer circumference surface of the rotation part 131, and particularly, the protrusion portion 132 may vertically protrude to the outer circumference surface of the rotation part 131.

A plurality of third screw threads 134 may be formed in the first side of the inner circumference surface of the rotation part 131, and a plurality of fourth screw threads 135 may be formed in the second side of the inner circumference surface of the rotation part 131.

The first screw threads 114 formed in the outer circumference surface of the first extension part 111 may be fastened to the third screw threads 134 formed in the inner circumference surface of the rotation part 131. Accordingly, the first extension part 111 may be fastened to the rotation part 131.

The second screw threads 124 formed in the outer circumference surface of the second extension part 121 may be fastened to the fourth screw threads 135 formed in the inner circumference surface of the rotation part 131. Accordingly, the second extension part 121 may be fastened to the rotation part 131.

In this case, as illustrated in FIGS. 2 and 3, the third screw threads 134 and the fourth screw threads 135 may be formed in opposite directions.

Therefore, when the rotation part 131 rotates, the first extension part 111 and the second extension part 121 may move in opposite directions.

For example, when the rotation part 131 rotates counterclockwise, the first extension part 111 and the second extension part 121 may move in a direction progressively closer to each other, and when the rotation part 131 rotates clockwise, the first extension part 111 and the second extension part 121 may move in a direction distancing from each other.

As another example, when the rotation part 131 rotates counterclockwise, the first extension part 111 and the second extension part 121 may move in a direction distancing from each other, and when the rotation part 131 rotates clockwise, the first extension part 111 and the second extension part 121 may move in a direction progressively closer to each other.

Hereinabove, an example where the first extension part 111 is inserted into the first side of the inner circumference surface of the rotation part 131 and the second extension part 121 is inserted into the second side of the inner circumference surface of the rotation part 131 has been described.

However, in the fastening part 100 according to the present disclosure, the first side of the rotation part 131 may be inserted into an inner circumference surface of the first extension part 111 and thus the first extension part 111 may be connected to the rotation part 131, and moreover, the second side of the rotation part 131 may be inserted into an inner circumference surface of the second extension part 121 and thus the second extension part 121 may be connected to the rotation part 131.

In this case, the first screw thread 114 may be formed on the inner circumference surface of the first extension part 111, the second screw thread 124 may be formed on the inner circumference surface of the second extension part 121, the third screw thread 134 may be formed on the first side of the outer circumference surface of the rotation part 131, and the fourth screw thread 135 may be formed on the second side of the outer circumference surface of the rotation part 131. In this case, as described above, the third screw threads 135 and the fourth screw threads 134 may be formed in opposite directions.

Hereinafter, a method of attaching the display 10 on the wall 20 by using the fastening part 100 will be described with reference to FIGS. 1 to 7.

Figure 4:
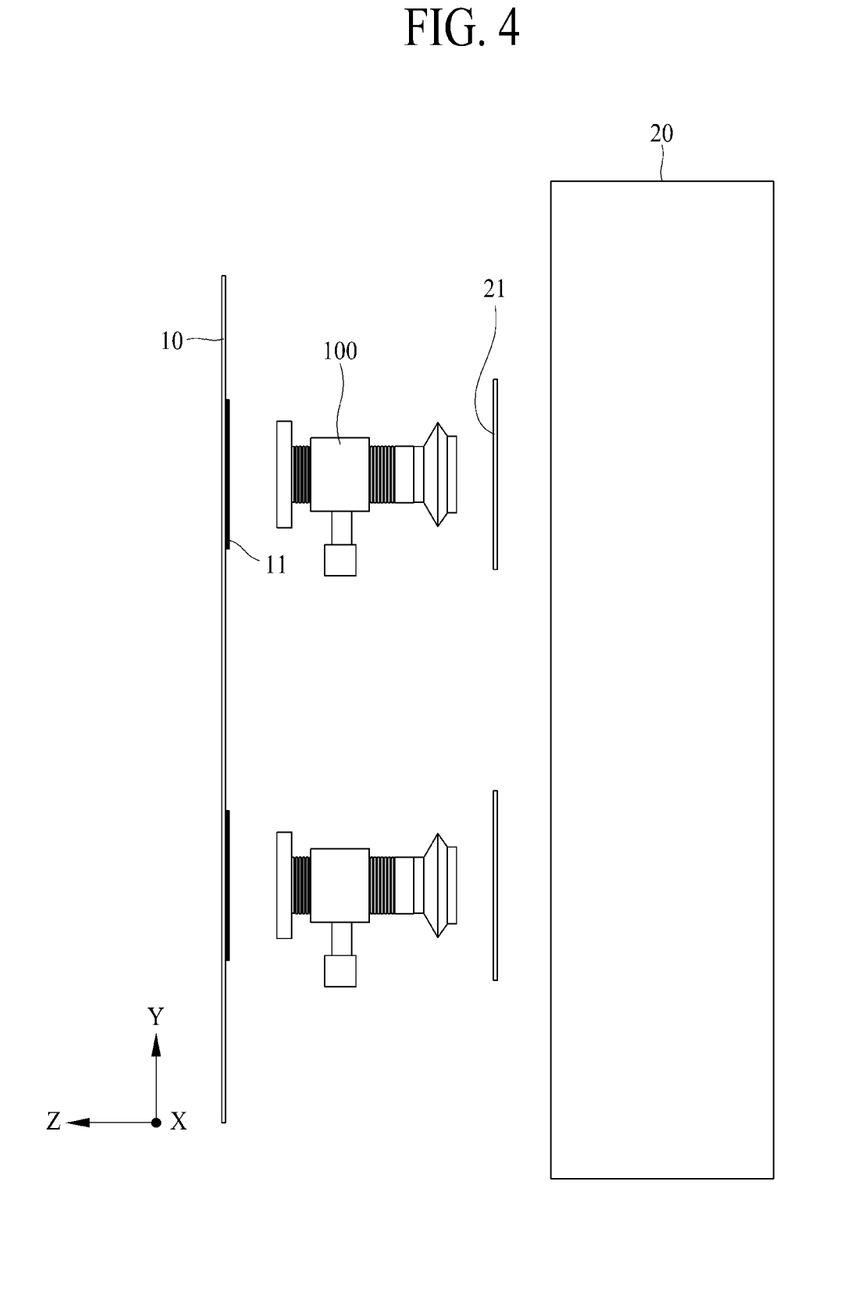
FIG. 4 is an exemplary diagram illustrating a state where a fastening part of a display fixing apparatus according to one embodiment of the present disclosure is disposed between a display and a wall.
Figure 5:
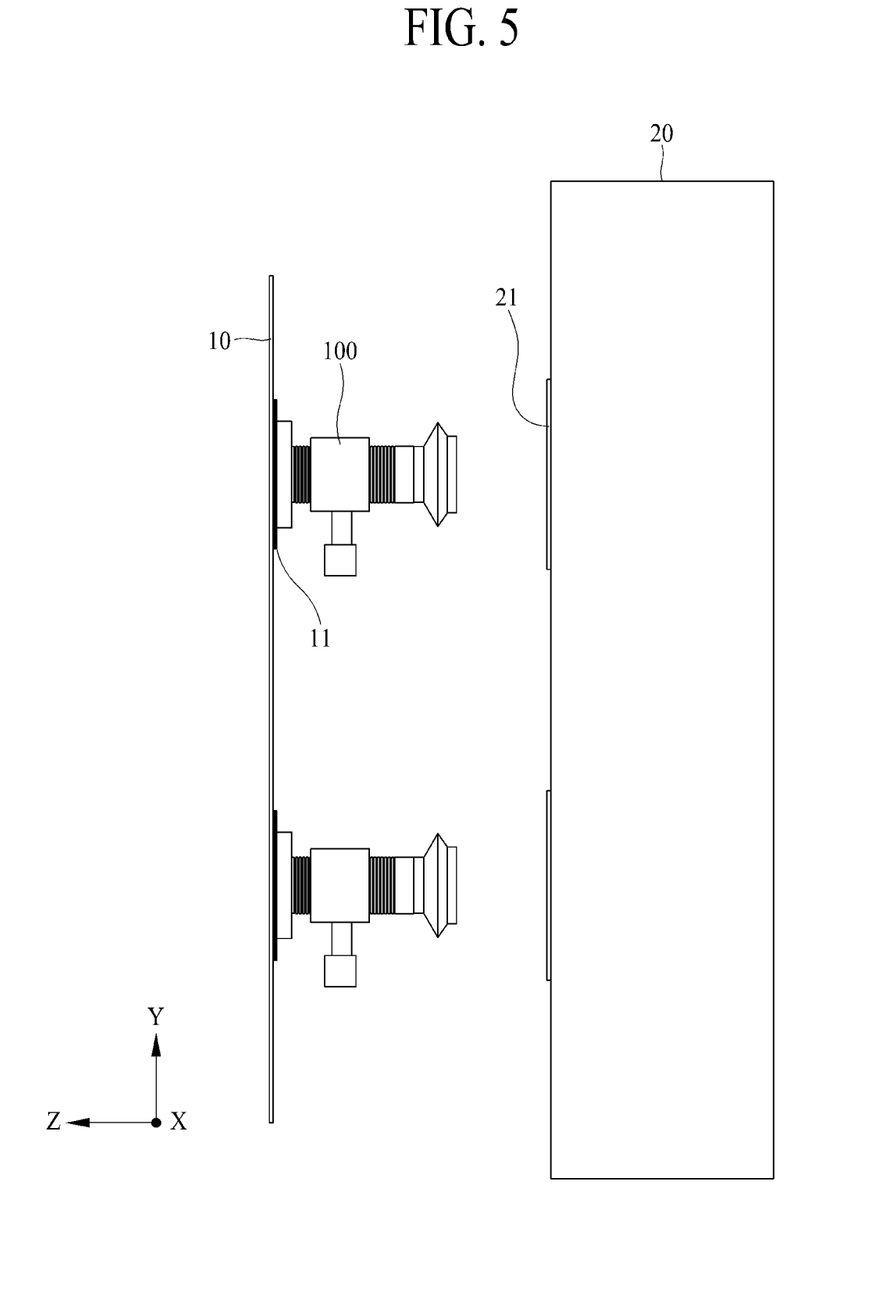
FIG. 5 is an exemplary diagram illustrating a state where a fastening part of a display fixing apparatus according to one embodiment of the present disclosure is attached on a rear surface of a display.
Figure 6:
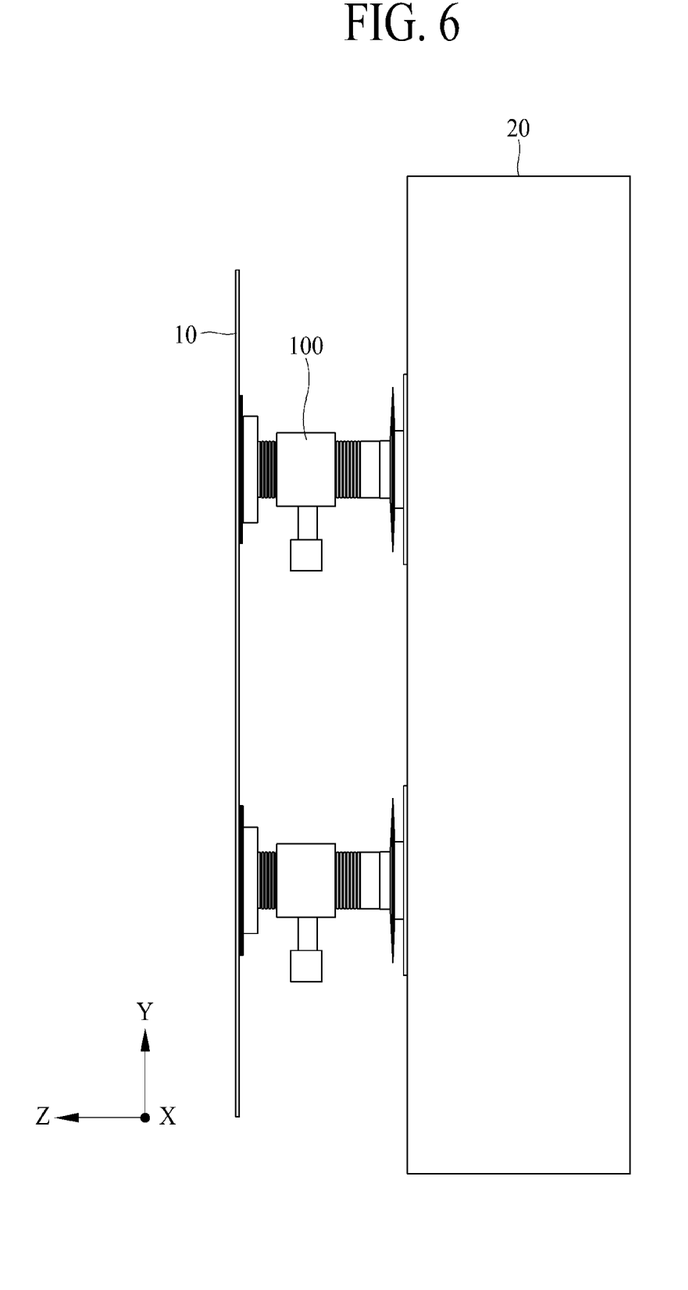
FIG. 6 is an exemplary diagram illustrating a state where a display is attached on a wall by a display fixing apparatus according to one embodiment of the present disclosure.
Figure 7A:
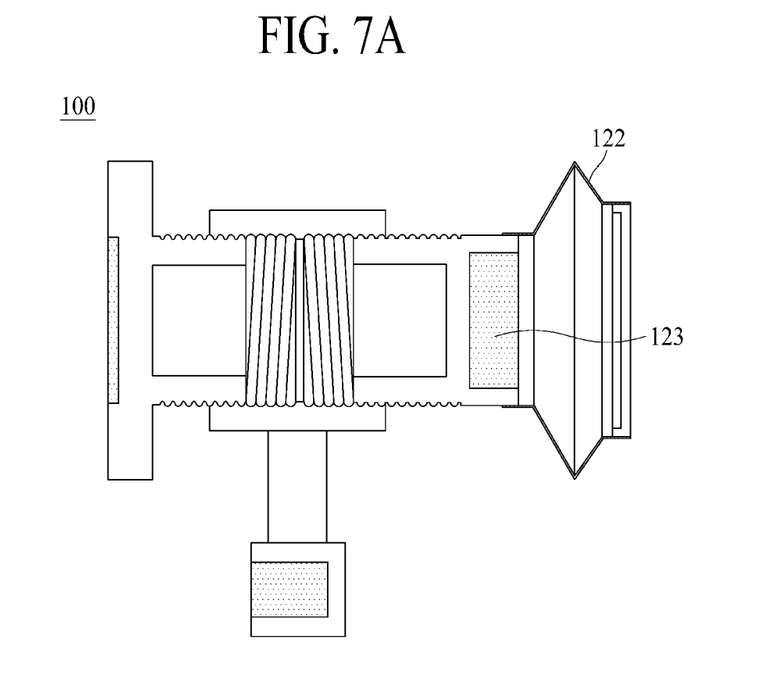
FIGS. 7A and 7B are exemplary diagrams illustrating changed states of a fastening part of a display fixing apparatus according to one embodiment of the present disclosure.
Figure 7B:
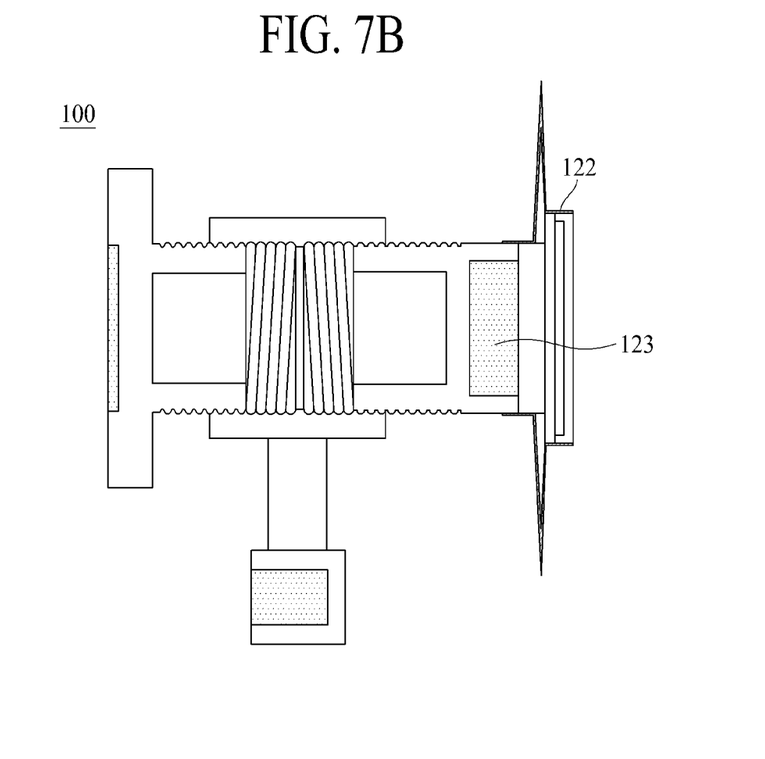

FIG. 4 is an exemplary diagram illustrating a state where a fastening part of a display fixing apparatus according to the present disclosure is disposed between a display and a wall, FIG. 5 is an exemplary diagram illustrating a state where a fastening part of a display fixing apparatus according to the present disclosure is attached on a rear surface of a display, FIG. 6 is an exemplary diagram illustrating a state where a display is attached on a wall by a display fixing apparatus according to the present disclosure, and FIGS. 7A and 7B are exemplary diagrams illustrating changed states of a fastening part of a display fixing apparatus according to the present disclosure. In the following description, descriptions which are the same as or similar to descriptions given above with reference to FIGS. 1 to 3 are omitted or will be briefly given.

The worker may place the fastening part 100 on the rear surface of the display 10 as illustrated in FIG. 4, and as illustrated in FIG. 5, the worker may attach the fastening part 100 on the rear surface of the display 10.

To this end, the display iron plate 11 may be provided on the rear surface of the display 10.

The display iron plate 11 may be fixed to the outer surface of the display 10 and may be exposed at the outside, or may be fixed to the inner surface of the display 10 and may not be exposed at the outside.

The display iron plate 11 may be implemented to have an area which is greater than that of the first magnet 113.

In this case, the first magnet 113 included in the display attachment part 110 in the fastening part 100 may be attached on the display iron plate 11, and thus, the fastening part 100 may be attached on the display 10.

Four display iron plates 11 may be respectively attached on portions corresponding to four corners of the display 10. In this case, as illustrated in FIG. 5, the fastening part 100 may be attached on each of the four display iron plates 11.

In a case where the fastening part 100 is attached on only the rear surface of the display 10, the second adhesive part 122 configuring the wall attachment part 120 may be maintained in an unfolded state as illustrated in FIG. 7A.

Therefore, the wall iron plate 21 attached on the wall 20 and the second magnet 123 included in the wall attachment part 120 may be apart from each other by a length of the second adhesive part 122, and thus, a magnetic force between the second magnet 123 and the wall iron plate 21 may be weak. Accordingly, the second magnet 123 may not be attached on the wall iron plate 21.

In a state where a certain interval between the second adhesive part 122 and the wall iron plate 21 is maintained, the worker may check a position at which the display 10 is to be placed.

An area of the wall iron plate 21 may be set to be greater than that of the second magnet 123. Accordingly, a position of the display 10 may be changed based on a position of the wall iron plate 21 with the second magnet 123 attached thereon.

For example, as illustrated in FIGS. 1 and 4 to 6, a position of the display 10 in an X-axis direction and a Y-axis direction of the wall 20 may be changed based on a position of the wall iron plate 21 with the second magnet 123 attached thereon.

Therefore, the worker may attach the second magnet 123 on the wall iron plate 21 in consideration of the position of the display 10 in the X-axis direction and the Y-axis direction of the wall 20.

When the worker has checked a position at which the second magnet 123 is to be attached and pushes the display 10 in a direction toward the wall 20, the fastening part 100 may also move in the direction toward the wall 20, and thus, the second magnet 123 included in the fastening part 100 may be attached on the wall iron plate 21.

When the worker attaches four fastening parts 100, included in the display 10, on four wall iron plates 21 provided at the wall 20, the display 10 may be attached on the wall 20.

When the fastening part 100 is attached on the wall iron plate 21, the second adhesive part 122 may be maintained in a folded state as illustrated in FIG. 7B. Accordingly, the second magnet 123 may be closely adhered to the wall iron plate 21, and thus, the second magnet 123 may be attached on the wall iron plate 21.

Through such a process described above, the display 10 may be attached on the wall 20, and then, the worker may move the fastening parts 100 in the X-axis direction or the Y-axis direction to move the display 10 in the X-axis direction or the Y-axis direction.

For example, as illustrated in FIG. 1, in a case where two displays 10 are attached on the wall 20, although the worker allows the two displays to be adhered to each other in the X-axis direction as close as possible and allows the two displays 10 to be accurately disposed in the Y-axis direction, the two displays 10 may not completely be aligned.

That is, as illustrated in a region illustrated by A in FIG. 1, when the two displays 10 are not completely aligned in the X-axis direction, the two displays 10 may be apart from each other in the X-axis direction, and moreover, may not accurately be aligned in the Y-axis direction. Also, when the two displays 10 are disposed in the Y-axis direction, the two displays 10 may be apart from each other in the Y-axis direction, and moreover, may not accurately be aligned in the X-axis direction.

Therefore, the worker may move the fastening parts 100 in the X-axis direction or the Y-axis direction to move the display 10 in the X-axis direction or the Y-axis direction.

To provide an additional description, the second magnet 123 and the wall iron plate 21 may be attached on each other by a magnetic force, and the magnetic force may be generated to have a magnitude for enduring a weight of the display 10.

Therefore, when the worker applies a force equal to or greater than the magnetic force to the wall attachment part 120, the second magnet 123 may move in the X-axis direction or the Y-axis direction with being attached on the wall iron plate 21.

That is, as illustrated in a region illustrated by A in FIG. 1, when there is a gap between the displays in the X-axis direction, the worker may move the fastening part 100 in the X-axis direction to allow the displays to be closely adhered to each other, in a state where the second magnet 123 is attached on the wall iron plate 21.

Moreover, when there is a gap between the displays in the Y-axis direction, the worker may move the fastening part 100 in the Y-axis direction to allow the displays to be closely adhered to each other, in a state where the second magnet 123 is attached on the wall iron plate 21.

Therefore, a position of the display 10 may be precisely adjusted in the X-axis direction and the Y-axis direction.

However, by using a method described above, a gap occurring between the displays 10 in a Z-axis direction may not be removed.

For example, when one of the two displays protrudes more than the other display in the Z-axis direction of FIG. 1, namely, when one of the two displays is more apart from the wall 20 than the other display, front surfaces of the two displays may not be disposed on the same horizontal plane. That is, front surfaces of the two displays may not be disposed on the same XY plane.

In this case, a gap between the front surfaces may occur in the Z-axis direction.

The gap occurring in the Z-axis direction may not be removed by a method described above with reference to FIGS. 4 to 7.

A method of removing the gap between the two displays occurring in the Z-axis direction will be described below with reference to FIGS. 8 to 10.

Figure 8:
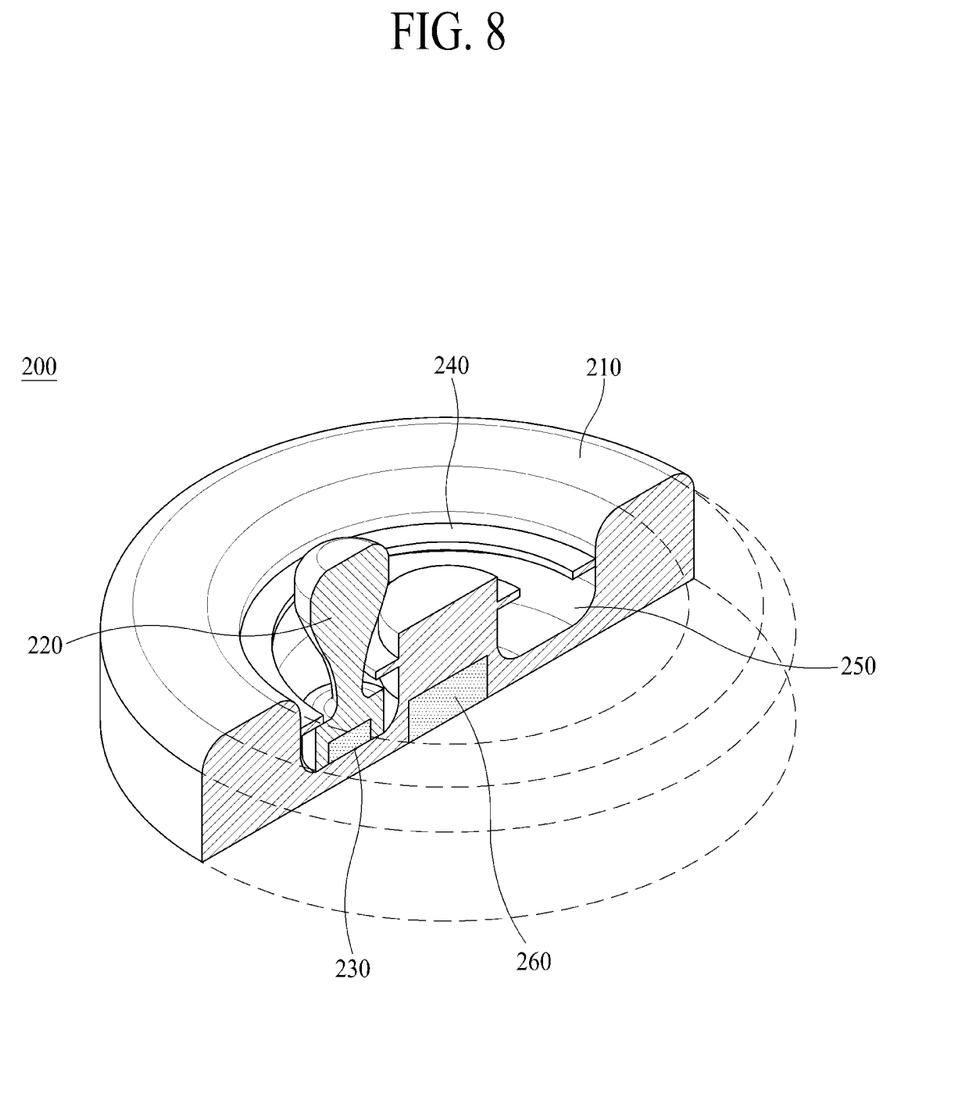
FIG. 8 is a diagram illustrating an embodiment of a configuration of a magnet wheel of a display fixing apparatus according to the present disclosure.
Figure 9:
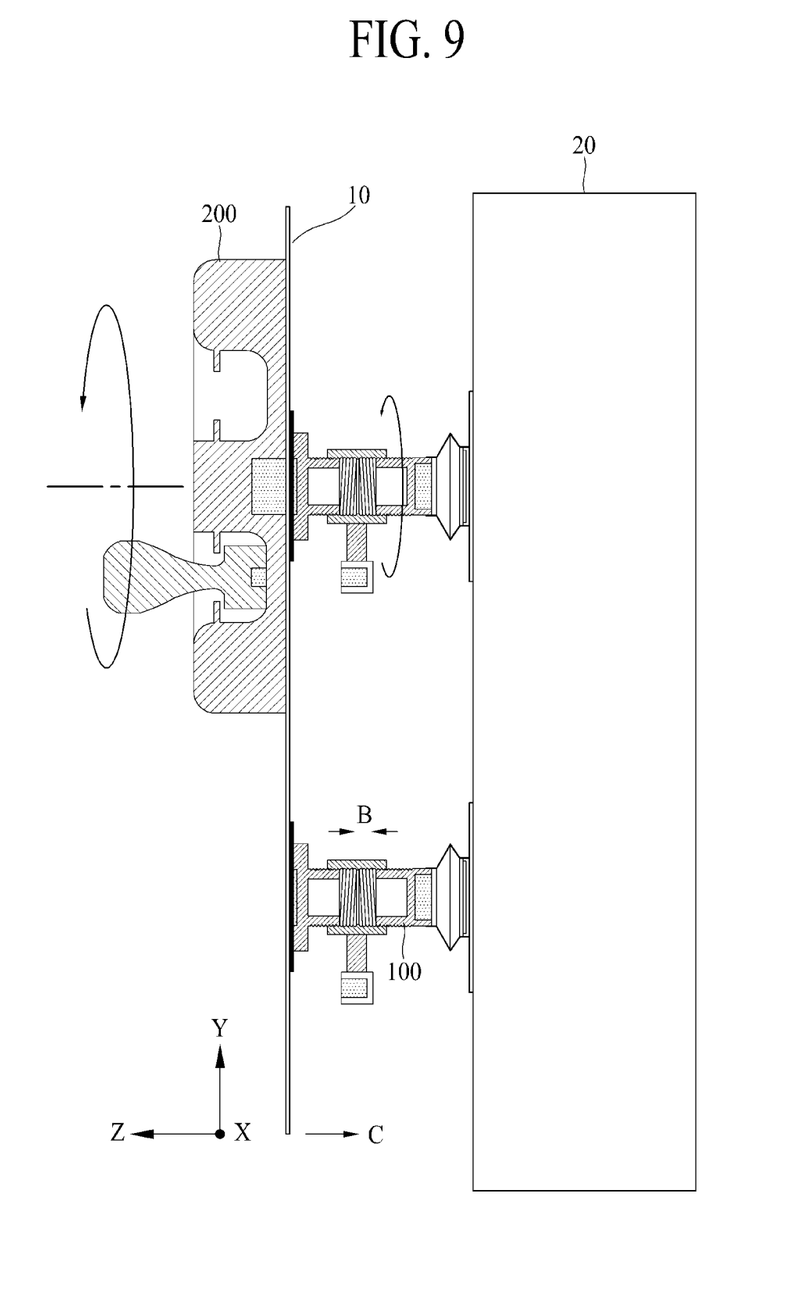
FIG. 9 is an exemplary diagram illustrating a method of moving a display in a Z-axis direction by using a display fixing apparatus according to one embodiment of the present disclosure.
Figure 10:
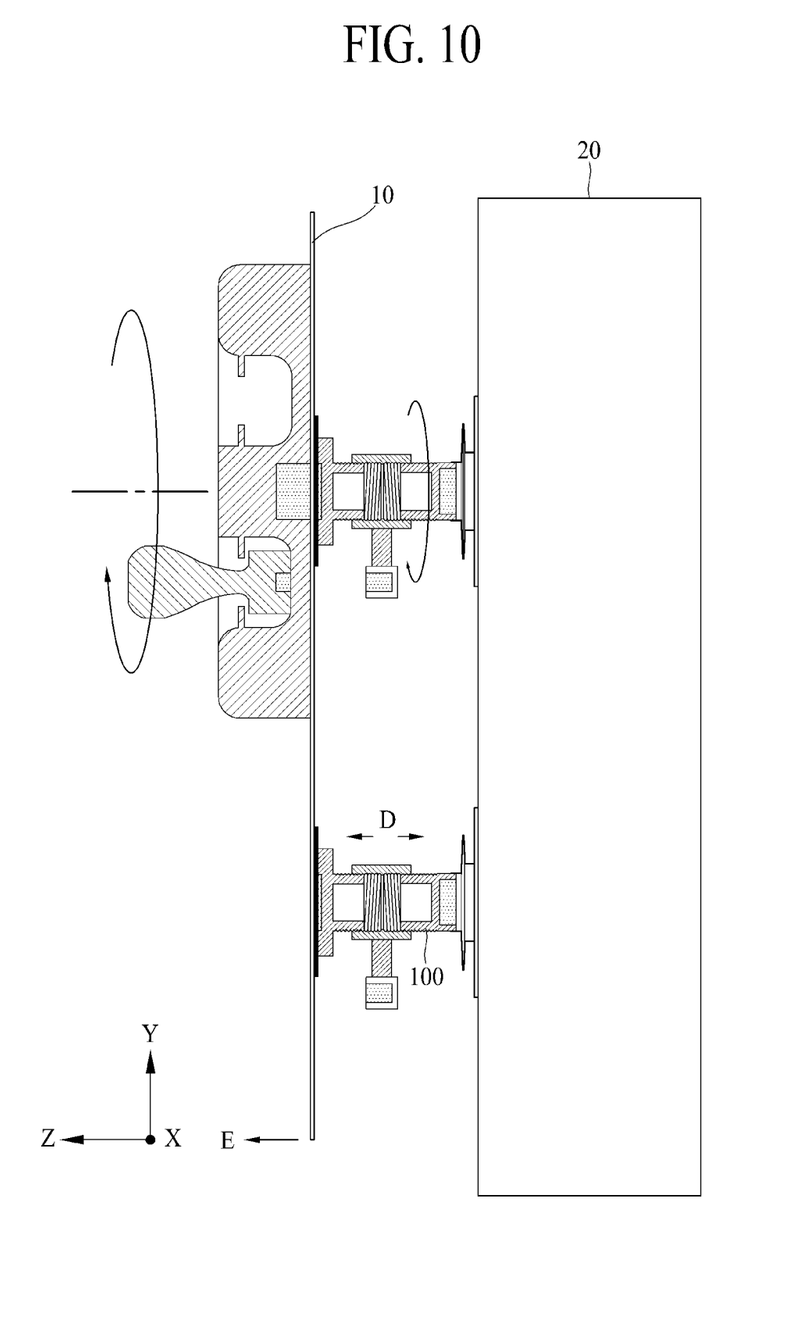
FIG. 10 is another exemplary diagram illustrating a method of moving a display in a Z-axis direction by using a display fixing apparatus according to one embodiment of the present disclosure.
Figure 11:
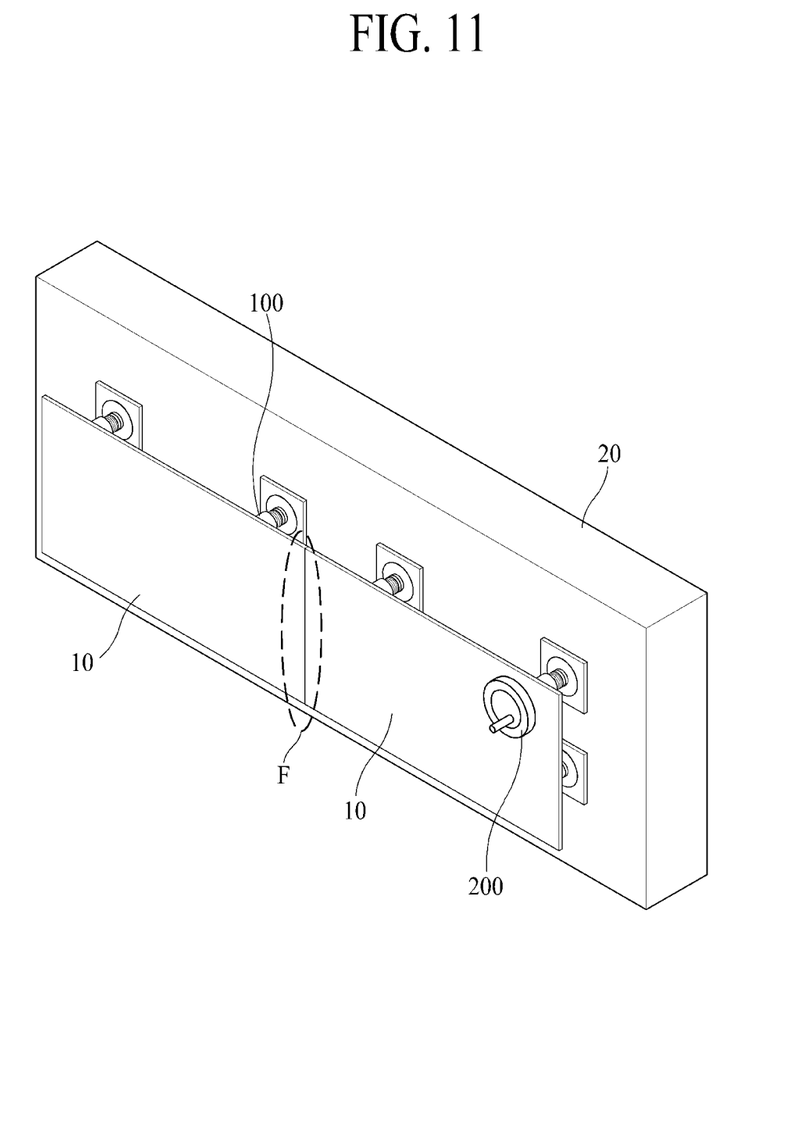
FIG. 11 is an exemplary diagram illustrating displays aligned by a display fixing apparatus according to one embodiment of the present disclosure.

FIG. 8 is a diagram illustrating an embodiment of a configuration of a magnet wheel of a display fixing apparatus according to the present disclosure, FIG. 9 is an exemplary diagram illustrating a method of moving a display in a Z-axis direction by using a display fixing apparatus according to the present disclosure, FIG. 10 is another exemplary diagram illustrating a method of moving a display in a Z-axis direction by using a display fixing apparatus according to the present disclosure, and FIG. 11 is an exemplary diagram illustrating displays aligned by a display fixing apparatus according to the present disclosure. Particularly, only a half portion of the magnet wheel 200 is illustrated in FIG. 8, and the other half portion may be implemented in the same shape as a shape illustrated in FIG. 8.

As described above, the display fixing apparatus according to the present disclosure may include the fastening part 100 having an adjustable length and a magnet wheel 200 including a rotating magnet. The fastening part 100 has been described above with reference to FIGS. 1 to 7, and thus, its detailed description is omitted. Hereinafter, therefore, a configuration and a function of the magnet wheel 200 will be described.

As illustrated in FIG. 8, the magnet wheel 200 may include a body 210 having a circular plate shape, a handle 220 provided in a groove 250 formed in a top surface of the body 210, and a rotating magnet 230 provided at a portion, which is adjacent to a bottom surface of the groove 250, of the handle 220.

The body 210 may be implemented in a circular plate shape, but is not limited thereto and may be implemented in various shapes.

In this case, the groove 250 may be formed in a circular shape.

That is, an outer shape of the body 210 may be variously changed, but the groove 250 may be formed in a circular shape.

A body magnet 260 may be provided at a center portion of the body 210. When the body 210 is disposed on a front surface of the display 10 as illustrated in FIGS. 9 and 10, the body magnet 260 may fix the body 210 to the display 10.

The body 210 may be fixed to a front surface of the display 10 by a magnetic force between the display iron plate 11 and the body magnet 260.

One side of the handle 220 may be inserted into the groove 250, and as illustrated in FIG. 8, the other side of the handle 220 may protrude to the outside of the groove 250.

A shape of the other side of the handle 220 may be variously formed as a shape which enables a worker to easily hold the handle 220.

The one side of the handle 220 may move along the groove 250 with being inserted into the groove 250.

That is, when the worker rotates the other side of the handle 220 along the groove 250, the one side of the handle 220 may rotate along the groove 250 with being inserted into the groove 250.

A stepped portion 240, which prevents the handle 220 (for example, the one side of the handle 220) from deviating from the groove 250, may be formed in the groove 250.

The stepped portion 240 may cover an upper end portion of the one side of the handle 220, and thus, the one side of the handle 220 may not deviate from the groove 250.

However, the stepped portion 240 may be configured to be inserted into a handle groove which is provided in a side surface of the one side of the handle 220.

That is, the stepped portion 240 may perform a function of preventing the one side of the handle 220 from deviating from the groove 250, and in order to perform the function, a shape and a position of the stepped portion 240 may be variously changed.

The rotating magnet 230 may be provided at a portion, which is adjacent to the bottom surface of the groove 250, of the handle 220.

The rotating magnet 230 may be embedded into the handle 220, or may be attached on a bottom surface of the handle 220.

When the worker rotates the handle 220, the rotating magnet 230 may move along the groove 250 along with the handle 220.

A magnetic force of the rotating magnet 230 may affect the fastening part 100 disposed on a rear surface of the display panel, and particularly, may affect the connection magnet 133 provided in the protrusion portion 132.

Therefore, when the rotating magnet 230 rotates along the groove 250, the connection magnet 133 provided in the protrusion portion 132 may be rotated by the rotating magnet 230. Accordingly, the protrusion portion 132 and the rotation part 131 connected to the protrusion portion 132 may rotate, and thus, an interval between the first extension part 111 and the second extension part 121 may decrease or increase.

To this end, the groove 250 may be formed in a circular shape which has the body magnet 260 as a center point, and a radius of the groove 250 may be set to a length corresponding to a vertical distance from a center axis of the rotation part 131 to the connection magnet 133. To provide a more detailed description, a distance from a center of a circle formed by the groove 250 to a center of the rotating magnet 230 may be set to a length corresponding to a vertical distance from the center axis of the rotation part 131 to a center of the connection magnet 133.

The body magnet 260 may be disposed at a position corresponding to the display iron plate 11 and the first magnet 113 may also be disposed at a position corresponding to the display iron plate 11, the body magnet 260, the first magnet 113, and the rotation part 131 may be disposed on almost the same straight line.

In this case, when the radius of the groove 250 is set to a length corresponding to a vertical distance from a straight line, where the center axis of the rotation part 131 (i.e., the body magnet 260, the first magnet 113, and the rotation part 131) are disposed, to the connection magnet 133, the rotating magnet 230 and the connection magnet 133 may also be disposed on a straight line parallel to the center axis.

Therefore, a virtual circle, which is formed when the connection magnet 133 rotates along the center axis of the rotation part 131, may almost match a shape of the groove 250. Accordingly, a magnetic force of the rotating magnet 230 rotating along the groove 250 may continuously affect the connection magnet 133, and thus, the connection magnet 133 may rotate along with the rotating magnet 230.

Rotating of the connection magnet 133 may denote that the protrusion portion 132 rotates, and when the protrusion portion 132 rotates, the rotation part 131 connected to the protrusion portion 132 may also rotate.

As described above, because the third screw threads 134 and the fourth screw threads 135 are formed in opposite directions, the first extension part 111 and the second extension part 121 may move in opposite directions when the rotation part 131 rotates.

For example, as illustrated in FIG. 9, when the handle 220 and the rotating magnet 230 rotate counterclockwise, the connection magnet 133 may also rotate counterclockwise along with the rotating magnet 230, and thus, the protrusion portion 132 and the rotation part 131 connected to the protrusion portion 132 may rotate counterclockwise.

When the rotation part 131 rotates counterclockwise, the first extension part 111 and the second extension part 121 may move in a direction (for example, a B direction) progressively closer to each other.

When the first extension part 111 and the second extension part 121 moves in a B direction and are closer to each other, the display 10 may move in a C direction illustrated in FIG. 9. That is, the display 10 may move in a direction, which is progressively closer to the wall 20, of the Z-axis direction.

For example, as illustrated in FIG. 10, when the handle 220 and the rotating magnet 230 rotate clockwise, the connection magnet 133 may also rotate clockwise along with the rotating magnet 230, and thus, the protrusion portion 132 and the rotation part 131 connected to the protrusion portion 132 may rotate clockwise.

When the rotation part 131 rotates clockwise, the first extension part 111 and the second extension part 121 may move in a direction (for example, a D direction) distancing from each other.

When the first extension part 111 and the second extension part 121 moves in the D direction and are farther away from each other, the display 10 may move in an E direction illustrated in FIG. 10. That is, the display 10 may move in a direction, which is farther away from the wall 20, of the Z-axis direction.

By using a moving direction of the display described above, the worker may move at least one of the displays along the Z axis so that the displays are disposed on the same XY plane.

For example, when two displays 10 illustrated in FIG. 1 are apart from each other on the Z axis because the two displays 10 are not disposed on the same XY plane, the worker may move at least one of the two displays 10 on the Z axis by using a method described above with reference to FIGS. 9 and 10. Therefore, the distance between one of the two displays 10 and the wall 20 may be the same as a distance between the other display and the wall 20, and thus, as illustrated in FIG. 11, the two displays 10 may be disposed on the same XY plane. That is, as illustrated in a region referred to by F in FIG. 11, the two displays 10 may be disposed on the same XY plane.

According to the present disclosure, because the worker does not need to enter a region between the display 10 and the wall 20, an interval between the display 10 and the wall 20 may be minimized.

Moreover, the fastening part 100 attached on the wall iron plate 21 may freely move in the X-axis direction or the Y-axis direction, and thus, the worker may accurately align at least two displays in the X-axis direction and the Y-axis direction.

Moreover, the fastening part 100 disposed on the rear surface of the display 10 may be rotated by the magnet wheel 200 disposed on the front surface of the display 10, and based on the rotation of the fastening part 100, the display 10 may be apart from the wall 20 or may be closely adhered to the wall 20. Accordingly, the worker may allow at least two displays to be apart from the wall 20 by the same distance in the Z-axis direction, and thus, the at least two displays may be disposed on the same XY plane.

Moreover, when the at least two displays 10 are attached on the wall 20 and one of the displays 10 needs to repair or replace, the worker may detach the display 10 from the fastening part 100 or may detach the fastening part 100 from the wall iron plate 21, thereby conveniently repairing or replacing the display 10.

According to the present disclosure, a worker may fix a display to a wall at a position in front of the display, detach the display from the wall, or change an angle of the display.

Moreover, according to the present disclosure, a worker may conveniently correct positions of an X axis, a Y axis, and a Z axis of a display by using a magnet, and thus, step heights of displays may be conveniently adjusted.

Moreover, according to the present disclosure, a worker may not move to a space between a display and a wall. Accordingly, according to the present disclosure, the space between the display and the wall may be minimized, and thus, displays may be efficiently installed even in a narrow space such as the inside of an elevator.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display fixing apparatus comprising:
    a fastening part having an adjustable length; and
    a magnet wheel including a rotating magnet,
    wherein the fastening part comprises:
        a display attachment part configured to be attached on a rear surface of a display;
        a wall attachment part configured to be attached on a wall by an adjustable magnetic force, and being movable on the wall; and
        a connection part connecting the display attachment part to the wall attachment part, wherein a connection magnet is embedded in the connection part, and
    wherein the connection magnet is rotated by the rotating magnet to adjust a length of the fastening part.

2. The display fixing apparatus of claim 1, wherein
    the display attachment part comprises a first adhesive part configured to be adhered to the rear surface of the display, a first extension part provided in a cylindrical shape and connected to the connection part, and a first magnet included in the first adhesive part,
    the wall attachment part comprises a second adhesive part configured to be adhered to the wall, a second extension part provided in a cylindrical shape and connected to the connection part, and a second magnet provided at a second side adjacent to the second adhesive part among a first side and a second side of the second extension part, the adjustable magnetic force being adjustable by changing a distance between the second magnet and the wall, and
    the connection part is provided in a cylindrical shape, and the connection part comprises a rotation part connected to the first extension part at a first side of the connection part and connected to the second extension part at a second side of the connection part, a protrusion portion protruding to an outer circumference surface of the rotation part, and the connection magnet provided in the protrusion portion.

3. The display fixing apparatus of claim 2, wherein
    a plurality of first screw threads are formed on an outer circumference surface of the first extension part,
    a plurality of second screw threads are formed on an outer circumference surface of the second extension part, and
    a plurality of third screw threads and a plurality of fourth screw threads, respectively engaging with the plurality of first screw threads and the plurality of second screw threads, are formed on an inner circumference surface of the rotation part.

4. The display fixing apparatus of claim 2, wherein
    a plurality of first screw threads are formed on an inner circumference surface of the first extension part,
    a plurality of second screw threads are formed on an inner circumference surface of the second extension part, and
    a plurality of third screw threads and a plurality of fourth screw threads, respectively engaging with the plurality of first screw threads and the plurality of second screw threads, are formed on an outer circumference surface of the rotation part.

5. The display fixing apparatus of claim 3, wherein the plurality of third screw threads and the plurality of fourth screw threads are formed in opposite directions.

6. The display fixing apparatus of claim 2, wherein the second adhesive part is provided in an adsorption plate shape which is folded or unfolded in a lengthwise direction of the second extension part.

7. The display fixing apparatus of claim 2, wherein the magnet wheel comprises:
    a body having a circular plate shape;
    a handle provided in a groove formed in a top surface of the body; and
    a rotating magnet provided at a portion, which is adjacent to a bottom surface of the groove, of the handle.

8. The display fixing apparatus of claim 7, wherein
    the rotating magnet moves along the groove along with the handle, and
    when the connection magnet provided in the protrusion portion is rotated by the rotating magnet, the protrusion portion and the rotation part connected to the protrusion portion rotate, and accordingly, an interval between the first extension part and the second extension part decreases or increases.

9. The display fixing apparatus of claim 7, wherein a distance from a center of a circle formed by the groove to a center of the rotating magnet corresponds to a vertical distance from a center axis of the rotation part to a center of the connection magnet.

10. The display fixing apparatus of claim 7, wherein a shape of the groove is circular.

11. The display fixing apparatus of claim 7, wherein a stepped portion, which prevents the handle from deviating from the groove, is provided in the groove.

12. The display fixing apparatus of claim 7, wherein a body magnet is provided at a center portion of the body.

13. The display fixing apparatus of claim 2, wherein a first side of the first extension part is fastened to the connection part, and the first adhesive part is provided at a second side of the first extension part.

14. The display fixing apparatus of claim 2, wherein the first adhesive part and the first extension part are provided as one body, or connected to each other through welding.

15. The display fixing apparatus of claim 2, wherein the second adhesive part is provided at the second side of the second extension part, and the first side of the second extension part is fastened to the connection part.

\* \* \* \* \*